US012676570B2

(12) United States Patent
Lynn

(10) Patent No.: US 12,676,570 B2
(45) Date of Patent: Jul. 7, 2026

(54) MISSILE SERVO ACTUATION SYSTEM AND METHOD OF CONTROLLING A SERVO ACTUATION SYSTEM IN A MISSILE

(71) Applicant: MBDA UK LIMITED, Stevenage (GB)

(72) Inventor: David Mark Lynn, Stevenage (GB)

(73) Assignee: MBDA UK LIMITED, Stevenage (GB)

( * ) Notice: Subject to any disclaimer, the term of this patent is extended or adjusted under 35 U.S.C. 154(b) by 127 days.

(21) Appl. No.: 17/922,621

(22) PCT Filed: May 17, 2021

(86) PCT No.: PCT/GB2021/051180
§ 371 (c)(1),
(2) Date: Nov. 1, 2022

(87) PCT Pub. No.: WO2021/234355
PCT Pub. Date: Nov. 25, 2021

(65) Prior Publication Data
US 2023/0163714 A1     May 25, 2023

(30) Foreign Application Priority Data

May 21, 2020     (EP) ..................................... 20275091
May 21, 2020     (GB) ..................................... 2007582

(51) Int. Cl.
*H02P 1/40*             (2006.01)
*G05B 19/4155*        (2006.01)
(Continued)

(52) U.S. Cl.
CPC .......... *H02P 29/66* (2016.02); *G05B 19/4155* (2013.01); *G05B 2219/34013* (2013.01)

(58) Field of Classification Search
CPC ...................................... H02P 6/06; H02P 7/29
See application file for complete search history.

(56) References Cited

U.S. PATENT DOCUMENTS 4,044,970 A * 8/1977 Maudal ................... B64C 15/14
                                                              244/3.22
6,320,338 B1 * 11/2001 Kang ........................ G01L 3/24
                                                              318/434
(Continued)

FOREIGN PATENT DOCUMENTS

CN         110906807 A      3/2020
GB             2066181 A      7/1981
JP         2006268903 A     10/2006

OTHER PUBLICATIONS

International Search Report and Written Opinion dated Aug. 31, 2021 issued in PCT/GB2021/051180.
(Continued)

*Primary Examiner* — Kawing Chan
*Assistant Examiner* — Charles S Laughlin
(74) *Attorney, Agent, or Firm* — Scully, Scott, Murphy & Presser, P.C.

(57) ABSTRACT

A method of controlling a servo actuation system in a missile is disclosed. The method comprises estimating a temperature of a motor comprised in the servo actuation system from a plurality of motor parameters; and controlling the motor based at least in part on the estimated motor temperature.

11 Claims, 4 Drawing Sheets

(51) Int. Cl.
   *H02P 25/20*        (2006.01)
   *H02P 29/66*        (2016.01)

(56)                References Cited

U.S. PATENT DOCUMENTS

| | | | |
|---|---|---|---|
| 6,462,491 B1* | 10/2002 | Iijima | H02P 9/18 |
| | | | 318/400.34 |
| 9,242,576 B1* | 1/2016 | Turnbull | H02P 29/68 |
| 9,807,528 B1 | 10/2017 | Jensen et al. | |
| 2003/0155885 A1* | 8/2003 | Zaremba | H02P 21/16 |
| | | | 318/727 |
| 2011/0084638 A1* | 4/2011 | Patel | H02P 6/18 |
| | | | 318/473 |
| 2012/0001582 A1 | 1/2012 | Park | |
| 2012/0306422 A1* | 12/2012 | Hao | G01K 7/22 |
| | | | 318/490 |
| 2017/0179869 A1 | 6/2017 | Sekiguchi et al. | |
| 2019/0046830 A1* | 2/2019 | Chiavegato | A63B 24/0062 |
| 2019/0158010 A1* | 5/2019 | Donolo | H02P 6/182 |
| 2020/0186069 A1* | 6/2020 | Moule | H02P 21/14 |
| 2021/0095733 A1* | 4/2021 | Fujita | F16D 65/18 |

OTHER PUBLICATIONS

GB Search Report dated Nov. 9, 2020 issued in GB 2007582.6.
Extended EP Search Report dated Sep. 30, 2020 issued in EP 20275091.5.
Anonymous: "High Performance Digital Servo Motor Controller", (Apr. 30, 2017), pp. 1-1 Retrieved from the Internet: URL:https://web.archive.org/web/2017043015 1109/https://www.moog.com/products/control lers-controls-software/defense-controllers-software/naval-controllers/high-performance-digital-servo-motor-controllers-for-nav al-applications.html; retrieved on Aug. 22, 2021.
Choi, J.W. et al., "Inverter output voltage synthesis using novel dead time compensation", IEEE Transaction on Power Electronics (Mar. 1996), vol. 11, No. 2, pp. 221-227.

* cited by examiner

MISSILE SERVO ACTUATION SYSTEM AND METHOD OF CONTROLLING A SERVO ACTUATION SYSTEM IN A MISSILE

FIELD OF THE INVENTION

The invention concerns a missile servo actuation system. The invention also concerns a method of controlling a servo actuation system in a missile.

BACKGROUND OF THE INVENTION

Electric servo motors in missile actuation systems may be required to operate over a wide temperature range; however, control of such motors can be difficult since key parameters such as electrical resistance and torque constant often vary significantly with temperature. Control of electric servo motors over a range of temperatures can be improved by compensating for temperature-dependent variations in the missile actuation system control systems.

It is known to measure motor temperature in a missile actuation system using a temperature sensor, and then to adapt the control signals according to the measured temperature values. A disadvantage of this approach is the complexity of the hardware and expense of the additional components.

It would be desirable to provide an improved missile servo motor control system which overcomes the afore-mentioned drawbacks.

SUMMARY OF THE INVENTION

In a first aspect, the invention provides a method of controlling a servo actuation system, according to claim 1.

In an advantage over systems and methods of the prior art, the present invention provides an estimated motor temperature value for input to motor control algorithms to enable compensation for motor temperature in motor control signals, without requiring temperature sensor hardware. The present invention provides savings on system complexity and cost, and a reduction in weight which is particularly desirable in missile design.

Aside from feeding in to the motor control algorithms, the motor temperature estimated from the one or more parameters may be used in a variety of other applications. For example it may be used for plant characterisation or detection of manufacturing faults, model validation, controller adaptive tuning, improved fault detection during operation potentially allowing graceful degradation, and/or self-protection against over-temperature.

In a first step of the method, the motor resistance may be estimated from motor voltage divided by motor current. Motor voltage may include an adjustment for the product of the motor velocity and the velocity constant. The estimated motor resistance may be equated to the motor voltage minus the product of the estimated velocity constant and the motor velocity, all divided by the motor current.

In a second step of the method, once the motor resistance and torque constant have been estimated, the motor temperature may be derived for example, by comparing the estimated motor resistance and/or torque constant against known values at a reference temperature (for example 20 degrees Celsius). For example, motor temperature may be equated to the ratio of estimated motor resistance to motor resistance at 20 degrees Celsius, minus one, all multiplied by (1/0.00393), and added to 20. Alternatively or additionally, motor temperature may be equated to the ratio of estimated torque constant to torque constant at 20 degrees Celsius, minus one, all multiplied by (−1/0.0012), and added to 20.

In a second aspect, the invention provides a servo actuation system according to claim 11.

It will of course be appreciated that features described in relation to one aspect of the invention may be incorporated into other aspects of the invention. For example, the method of the invention may incorporate any of the features described with reference to the apparatus of the invention and vice versa.

DESCRIPTION OF THE DRAWINGS

An embodiment of the invention will now be described by way of example only with reference to the accompanying drawings of which.

DETAILED DESCRIPTION

Figure 1:
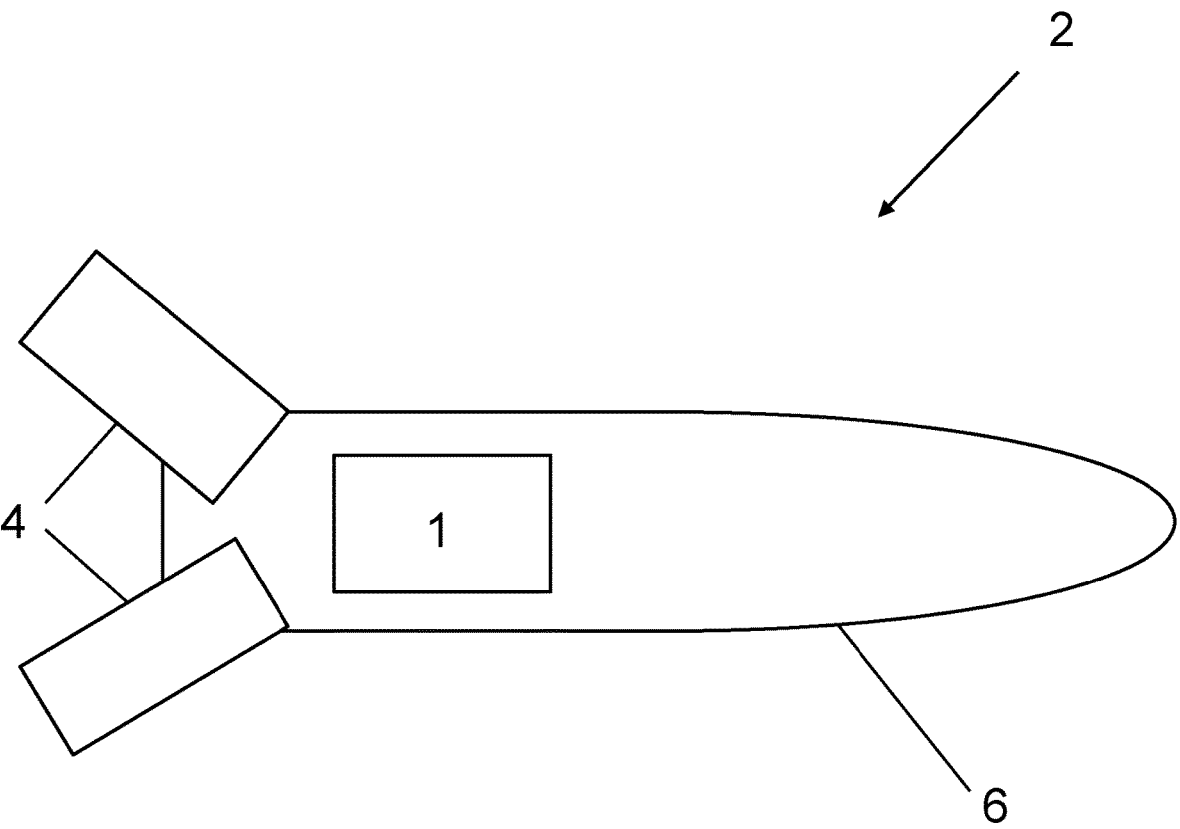
FIG. 1 is a schematic diagram showing a servo actuation system in a missile, according to the example embodiment of the invention.

According to the example embodiment of the invention, a guided missile 2 has four tail fins 4 (only two of which are visible in FIG. 1) which are actuated by a servo actuation system 1 to rotate the tail fins 4 with respect to the missile body 6, through a range of deflection angles (FIG. 1). In an alternative embodiment, a missile may have several servo actuation systems used for actuating different mechanical components of the missile such as wings, or a fuel pump, in addition to the tail fins.

Figure 1A:
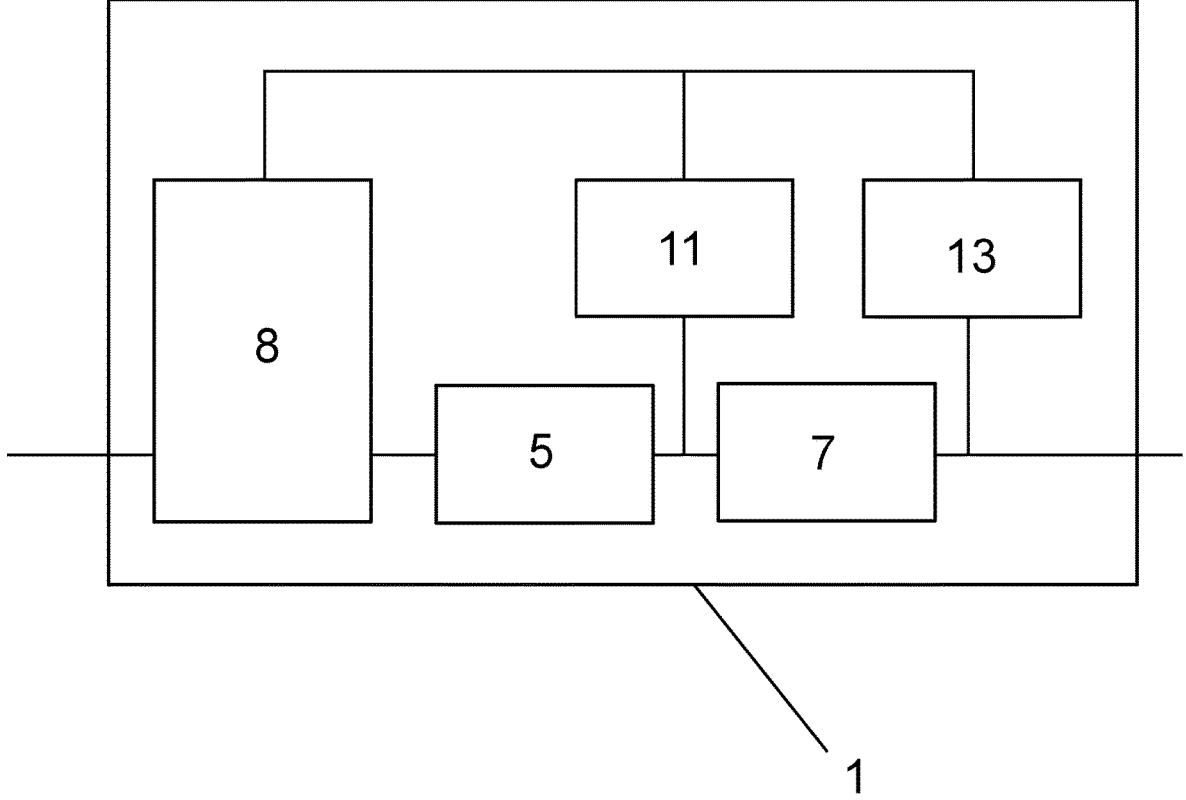
FIG. 1*a* is a schematic diagram of the components of the servo actuation system of FIG. 1.

The servo actuation system 1 of the example embodiment of the invention includes a processor 8, an inverter 5, a servo motor 7, a current sensor 11 and a position sensor 13 (FIG. 1*a*). The processor 8 is connected in series with the inverter 5 and the servo motor 7. The current sensor 11 is located downstream of the inverter 5 and upstream of the motor 7. The position sensor 13 is located downstream of the motor 7, on the motor rotor (not shown).

In the example embodiment of the invention, the motor 7 is a brushless DC servomotor with a construction known in the art and not discussed further herein. The inverter 5 is in this example embodiment is a three-phase MOSFET-based inverter.

Figure 2:
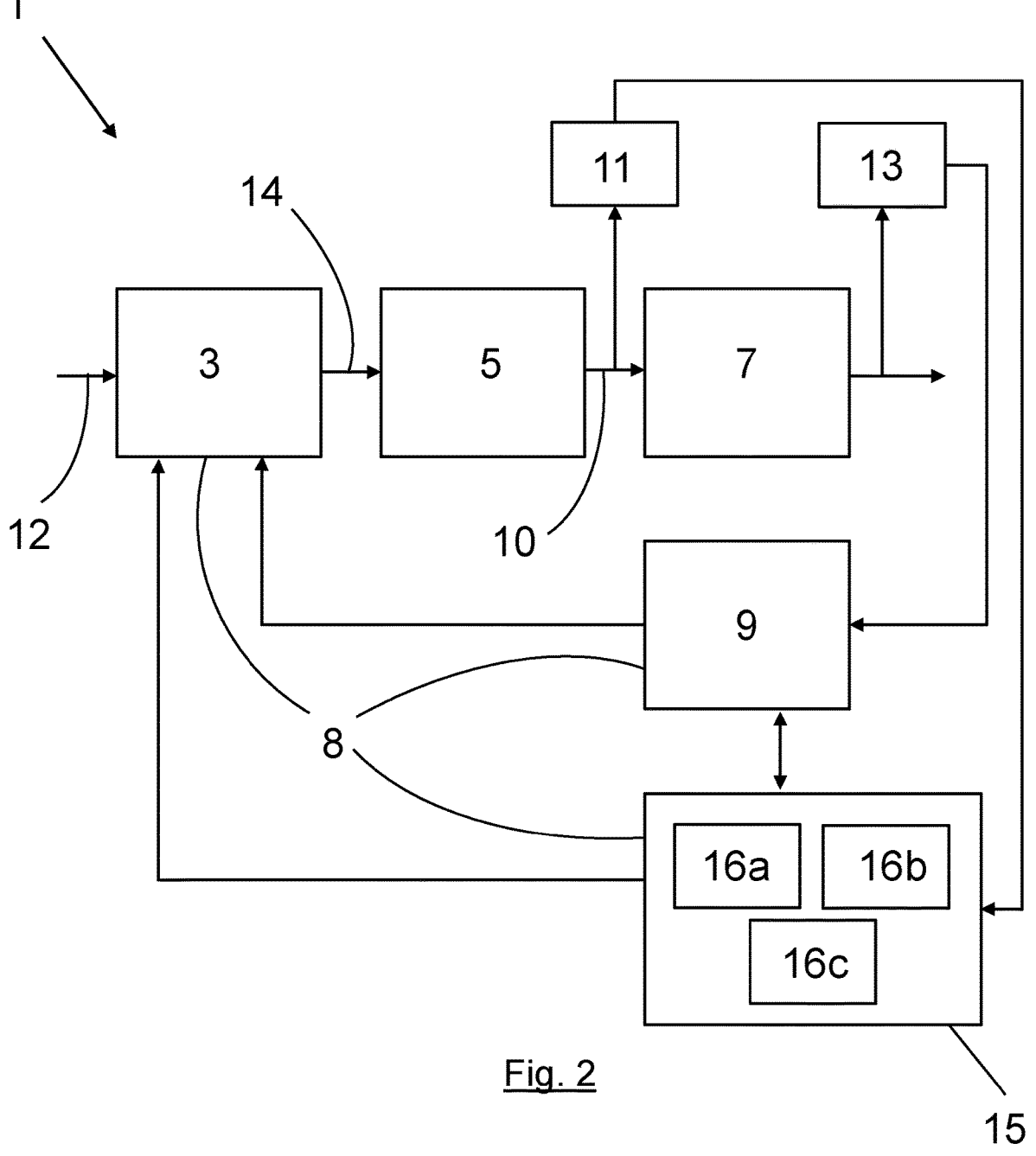
FIG. 2 is a schematic diagram of the functional modules of the servo actuation system of FIG. 1.

The inverter 5 imposes AC motor voltage demands 10 on the motor 7 terminals by switching the motor 7 terminals between the high and low sides of the power supply in a controlled switching sequence (FIG. 2). The rotor (not shown) of the motor 7 moves according to the demanded voltage 10, and the output shaft (not shown) actuates the fins via a gear-box (not shown). The electro-mechanical operation of the motor 7 is known in the art and not discussed further herein.

The processor 8 contains software modules, including a controller 3, a state observer 9 and a parameter estimator 15. In an alternative embodiment the software modules could be implemented in hardware, for example using FPGAs).

The controller 3 receives a demanded motion (or position) input 12 relating for example, to a missile fin position, and outputs a DC demanded voltage signal 14 to the inverter 5.

The state observer 9 provides a feedback pathway from the motor 7 to the controller 3. The state observer 9 estimates parameters of the motor 7 from measured motor input and/or output values, and feeds back information on the motor condition to the controller 3 such that the control (demanded voltage) signals 14 can be adjusted accordingly. For example, in operation, the state observer 9 estimates motor velocity and acceleration based on the rotor position measurements of the position sensor 13, and outputs the estimated values along with the measured rotor position values to the controller 3.

The state observer 9 also outputs to the parameter estimator 15, where further parameters of the motor 7 are calculated. The parameter estimator 15 calculates motor temperature for example based on the motor velocity and acceleration values already inferred by the state observer 9, the measured motor current values from the current sensor 11, and estimates of the motor voltage. The motor temperature estimates and/or other parameters are output to the controller 3 and the state observer 9. A further feedback pathway is therefore provided from the motor 7 to the controller 3 via the state observer 9 and the parameter estimator 15. The parameter estimator 15 contains a first estimator 16a, a second estimator 16b and a comparator 16c.

Figure 3:
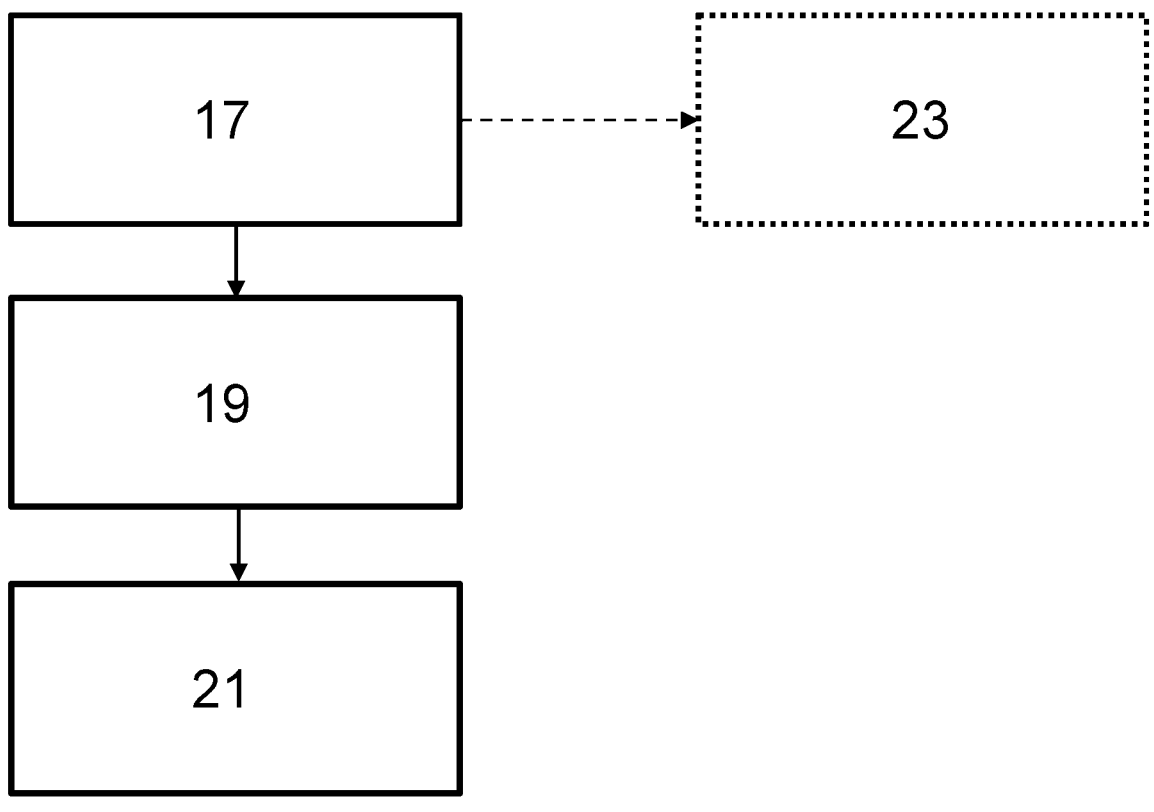
FIG. 3 is a flow diagram of a method of controlling the motor in the servo actuation system of FIGS. 1-3.

In this example embodiment, the motor temperature is calculated as follows:

In a first step 17 of the method of the example embodiment of the invention (FIG. 3), the first estimator 16a in the parameter estimator 15 estimates the motor resistance and torque constant (i.e. the velocity constant), using a recursive least squares algorithm:

$$R_{est} = \frac{\text{voltage} - (vel\ const_{est} \times vel)}{\text{current}}$$

$R_{est}$=motor resistance (estimated)
vel=motor velocity
vel const$_{est}$=velocity constant (estimated) i.e. torque constant (estimated)
current=motor current voltage=motor voltage The motor current is measured using the current sensor 11. In this example embodiment, the motor voltage and motor velocity are each estimated online (i.e. in real-time during operation) by the state observer 9; the motor velocity is derived from position measurements made using the position sensor 13 located on the rotor (although in an alternative embodiment it may be measured directly).

The motor true voltage is assumed to follow the demanded voltage after scaling for the inverter duty cycle and compensating for deadband non-linearity in the inverter 5. The motor voltage is calculated by the state observer 9 as the product of the demanded voltage and inverter duty cycle. A correction is made to the inverter duty cycle, to compensate for deadband introduced by the inverter 5. The method of deadband compensation is known and described in J. W. Choi et al. "Inverter output voltage synthesis using novel dead time compensation", IEEE Transaction on Power Electronics, Vol 11, No. 2, March 1996, pp. 221-227.

In a second step 19 of the method of the example embodiment of the invention, once the motor resistance and torque constant have been estimated, then the motor temperature is derived by the comparator 16c by comparing the estimated motor resistance and/or torque constant against known values at a reference temperature (in the example embodiment, 20 degrees Celsius):

$$\text{Temperature} = [((R_{est}/R_{20deg\ C.})-1)\times(1/0.00393)]+20$$

Temperature=motor temperature
$R_{est}$=motor resistance (estimated)
$R_{20deg\ C.}$=motor resistance at 20 degrees Celsius
And/or:

$$\text{Temperature} = [((k_{test}/kt_{20deg\ C.})-1)\times(-1/0.0012)]+20$$

Temperature=motor temperature
$k_{test}$=torque constant (estimated)
$kt_{20deg\ C.}$=torque constant at 20 degrees Celsius
Where kt is the torque constant.

The inventors have recognised that resistance and torque constant, as electrical parameters, are good indicators as they exhibit high repeatability (i.e. the way that temperature affects the motor resistance and torque constant is repeatable). Other parameters could be used but are less preferable. Temperature affects friction, allowing some inference to be made from the mechanical dynamic performance of the motor; however, the effect is variable and is heavily disturbed by variable mechanical loads. The electrical parameters are immune to the mechanical load conditions.

The motor resistance has been found to be easier to estimate accurately if there is a large range of current in the underlying data; the torque constant has been found to be easier to estimate accurately if there is a large range of speed. The inventors have recognised that the temperature estimation function can be adjusted to place more weight on one or other of the estimated parameters (motor resistance and torque constant).

In the example embodiment the weighting is chosen dynamically, based on the richness of the data. The parameter with the richer data is more likely to be accurate, and so is given a higher weighting in the temperature estimation calculation. If the voltage/current data is richer than the velocity data then the motor resistance is given a higher weighting than the torque constant, and vice versa. Use of a dynamic weighting provides a more accurate temperature estimate. This has various benefits including making it more likely that the protection against overheating triggers at the correct time; that any controller gain scheduling is more effective; and model validation data is more accurate.

The richness comparison also enables cross-checking: if both the voltage/current data and velocity data are rich, but the parameter estimates are not consistent with the same temperature, then that is a useful indication that a fault has developed, such as an inter-winding short-circuit, fractured magnet, or cable/connector damage.

In another example embodiment of the invention, the temperature could be estimated from the motor resistance and torque constant using constant weightings, for example a constant weighting of 50:50. In another example embodiment of the invention, 100% weighting could be placed on one of motor resistance or torque constant. If there is little range in either the current or velocity data, then optionally high frequency current pulses can be introduced that have negligible net effect on the motor torque/acceleration, but provide sufficiently rich voltage/current data for the motor resistance, and then temperature, to be estimated. The introduction of sharp current pulses in order to get richer data also increases the effectiveness of the system, making the temperature estimate more accurate.

In a third step 21 of the method of the example embodiment of the invention, once the motor temperature is estimated, it is output from the parameter estimator 15 to the controller 3 (or in an alternative embodiment could be fed back via the state observer 9). The motor control algorithms then take account of the temperature to adjust the control signals which are provided to the inverter 5.

In the example embodiment of the invention, the motor control algorithms are adapted to include gain-scheduling so as to maintain current, velocity and position control performance despite variations in motor torque constant and resistance due to temperature changes. In other words, the proportional and integral gains change in order to maintain the desired closed-loop transfer function of the system, counteracting changes in the plant parameters. Furthermore, in the example embodiment of the invention, the motor control algorithms are adapted to include a cut-out function so that when the motor temperature exceeds a pre-determined threshold, the motor drive is disabled, thus protecting the motor from overheating.

Use of dynamic weightings and/or the introduction of sharp current pulses provides a more accurate temperature estimate, which has various benefits including making it more likely that the protection against overheating triggers at the correct time; that any controller gain scheduling is more effective; and model validation data is more accurate.

In a further advantage of the example embodiment of the invention, the torque constant derived by the first estimator 16a can be used to derive further useful parameters of the motor.

In an optional fourth step 23 of the method motor inertia and friction are estimated by the second estimator 16b in the parameter estimator 15 from the estimated torque constant and the measured motor velocity and motor current data, using a using a recursive least squares algorithm:

$$kt_{est} = \frac{(intertia_{est} \times acc) + (visc\ fr_{est} \times vel) + coul\ fr_{est}}{current}$$

Kt$_{est}$=torque constant (taken from first estimator)
inertia$_{est}$=motor inertia (estimated)
acc=motor acceleration
viscous fr$_{est}$=viscous friction (estimated)
vel=motor velocity
coul fr$_{est}$=coulomb friction (estimated)
current=motor current The motor acceleration is estimated online (i.e. in real-time during operation) by the state observer 9. The motor acceleration is derived from the motor rotor position measurements, but in an alternative embodiment may be measured directly. The estimated motor inertia and friction, as useful parameters, can then be used in a variety of other applications to improve motor performance.

Whilst the invention has been described and illustrated with reference to a particular embodiment, it will be appreciated by those of ordinary skill in the art that the invention lends itself to many different variations not specifically illustrated herein. By way of example only, certain possible variations will now be described.

The example embodiment of the invention concerns a missile; however, the technique applies to other motor drive systems too, such as vacuum cleaners, cars, and industrial drives. The estimated temperature may be used in a variety of applications, by way of example including: plant characterisation/detection of manufacturing faults; model validation; controller adaptive tuning; and improved fault detection in operation, potentially allowing graceful degradation.

In plant characterisation, if temperature is inferred using the first estimator and the second estimator is used to infer the friction, then the temperature dependence of friction can be estimated. In manufacturing pass-out tests, if the estimated torque constant and resistance are inconsistent with a single temperature value, then that is an indicator that something is wrong in the hardware build. If the estimated resistance and torque constant parameter values are outside their expected ranges, then that indicates a problem. If the friction estimate produced by the second estimator is unexpectedly high then that could indicate that the bearing grease is wrong, or that the pre-loads are too high. In model validation, the estimation data can inform the model. The estimated temperature may be used to validate thermal models of the motor and the environment local to the motor for example to determine and report the temperature of the motor in operational or test environments where the use of discrete temperature sensors is impractical, or to determine the ambient temperature prior to operation of the motor after a period of being inactive. In adaptive tuning, system performance can be maintained despite significant variation in the plant parameters. In fault detection, if the parameter estimates are either not credible, or their rate of change is not credible, or the temperature implied by the two parameter estimates (resistance and torque constant) is not consistent, then a fault may be detected.

Where in the foregoing description, integers or elements are mentioned which have known, obvious or foreseeable equivalents, then such equivalents are herein incorporated as if individually set forth. Reference should be made to the claims for determining the true scope of the invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of controlling a servo actuation system in a missile, the method comprising the steps of:

estimating a temperature of a motor comprised in the servo actuation system from a plurality of motor parameters including at least one of a motor resistance or a torque constant;

wherein the at least one of the motor resistance or the torque constant are estimated by:

introducing high frequency current pulses;

measuring motor current;

estimating motor voltage and motor velocity; and determining using a recursive least squares algorithm the at least one of the motor resistance or the torque constant based on the motor current measured, the motor voltage and the motor velocity estimated;

estimating motor inertia and friction from the estimated motor temperature from the plurality of motor parameters; and controlling the motor in the missile based at least in part on the estimated motor temperature to maintain target performance criteria for current, velocity and position when the estimated motor temperature is less than a temperature threshold and the estimated motor temperature has changed from a prior estimated motor temperature, wherein the high frequency current pulses are arranged to have negligible effect on a motor torque or a motor acceleration.

2. A method according to claim 1, wherein the step of estimating a temperature of a motor includes comparing the plurality of motor parameters with known values at a reference temperature.

3. A method according to claim 1, wherein the step of estimating motor voltage includes determining a demanded voltage and compensating for the effects of inverter dead-band.

4. A method according to claim 1, wherein the step of estimating a temperature of a motor comprises weighting the plurality of motor parameters.

5. A method according to claim 1, wherein the controlling the motor in the missile based at least in part on the estimated motor temperature to maintain target performance criteria for current, velocity and position comprises generating a control signal using one or more control algorithms, wherein the one or more control algorithms include a gain-scheduling algorithm, and wherein the gains are dynamically adjusted to maintain the target performance criteria for current, velocity and position.

6. A method according to claim 1, wherein the controlling the motor in the missile based at least in part on the estimated motor temperature to maintain target performance criteria for current, velocity and position comprises generating a control signal using one or more control algorithms, wherein the one or more control algorithms include a cut-off function, such that the motor is disabled when the estimated motor temperature exceeds the temperature threshold.

7. A method according to claim 4, wherein the weights dynamically change based on a characteristic of each of the plurality of motor parameters as determined by a range of change or rate of change of each during a measurement.

8. A servo actuation system in a missile, the system comprising:

a motor configured to control a mechanical component in the missile;

a controller;

a parameter estimator comprising a comparator, a first estimator and a second estimator, the parameter estimator configured to estimate motor temperature in the missile from a plurality of motor parameters including a motor resistance and a torque constant, the parameter estimator including the first estimator configured to estimate the motor resistance and the torque constant by:

introducing high frequency current pulses;

measuring motor current;

estimating motor voltage and motor velocity; and determining using a recursive least squares algorithm the motor resistance and the torque constant based on the motor current measured, the motor voltage and the motor velocity estimated, wherein the motor temperature is inferred by the comparator from the estimated motor resistance and torque constant and the second estimator is configured to estimate motor inertia and friction from the inferred motor temperature, wherein the high frequency current pulses are arranged to have negligible effect on a motor torque or a motor acceleration.

9. A servo actuation system according to claim 8, wherein the controller is configured to control the motor in the missile based at least in part on the estimated motor temperature to maintain target performance criteria for current, velocity and position when the estimated motor temperature is less than a temperature threshold and the estimated motor temperature has changed from a prior estimated motor temperature.

10. A servo actuation system according to claim 9, wherein the mechanical component is selected from a group consisting of a wing, tail fin and fuel pump.

11. A servo actuation system according to claim 8, wherein the first estimator is configured to dynamically weight the plurality of motor parameters in estimating the motor temperature.

* * * * *